United States Patent [19]

Ganci

[11] 4,439,240

[45] Mar. 27, 1984

[54] AQUEOUS MILLING OF QUINACRIDONE PIGMENT

[75] Inventor: James B. Ganci, Wilmington, Del.

[73] Assignee: E. I. Du Pont De Nemours & Company, Wilmington, Del.

[21] Appl. No.: 466,938

[22] Filed: Feb. 16, 1983

[51] Int. Cl.³ .............................................. C08J 3/00
[52] U.S. Cl. .................................. 106/288 Q; 106/309
[58] Field of Search ............................ 106/288 Q, 309

[56] References Cited

U.S. PATENT DOCUMENTS

| | | | |
|---|---|---|---|
| 3,752,688 | 8/1973 | Fuchs et al. | 106/309 |
| 4,088,506 | 5/1978 | Wetzel | 106/288 Q |
| 4,094,699 | 6/1978 | Fitzgerald | 106/288 Q |
| 4,158,572 | 6/1979 | Blackburn et al. | 106/288 Q |
| 4,260,424 | 4/1981 | Mizoguchi et al. | 106/309 |
| 4,371,642 | 2/1983 | Jaffe | 524/88 |

Primary Examiner—James Poer

[57] ABSTRACT

Pigmentary grade quinacridone pigments are prepared from crude quinacridone by dry milling the crude quinacridone to form aggregated low crystallinity material followed by milling the low crystallinity in water using steel shot as the milling elements. In a preferred aspect of the invention from 0.5 to 5 wt percent, based on quinacridone, of phthalimidomethylquinacridone is present in the water milling step. In another preferred aspect of the invention the water milled pigment is extracted with a dilute hot acid in the presence of naphthenic acids and then dried.

5 Claims, No Drawings ered pigmentary grade quinacridone product of improved pigment quality. A minimum of 4–6 hours is usually required in a commerical size mill, but this may be extended to as much as 12–18 hours or even more. Considerably longer times are required in laboratory scale or semi-works scale mills. Generally the aqueous milling should be carried out at 10° to 60° C. with 20° to 50° C. being preferred.

AQUEOUS MILLING OF QUINACRIDONE PIGMENT

BACKGROUND

1. Field of the Invention

The present invention relates to the preparation of pigmentary grade quinacridone from preground quinacridone by aqueous ball milling.

2. Prior Art

U.S. Pat. No. 3,752,688 discloses grinding pigments in an alkaline aqueous medium to reduce the particle size of the pigment.

U.S. Pat. No. 4,158,572 discloses dry milling a phthalocyanine crude to reduce its particle size followed by stirring the pigment in an aqueous medium containing a surfactant.

SUMMARY OF THE INVENTION

The present invention relates to a process for converting crude quinacridone into pigmentary grade quinacridone. In the first step the crude quinacridone is dry ball milled to reduce the particle size of the quinacridone to below pigmentary particle size. Then the dry milled quinacridone is ball milled in an aqueous medium. The aqueous medium contains a small amount of a base and a particle growth inhibitor.

DETAILED DESCRIPTION

Particle size control of quinacridone pigments is difficult in the prior art dispersion milling process, since it is dependent on the ripening and extraction step in dilute sulfuric acid which is relatively ineffective in growing the pigment particles from the low crystallinity material generated in a long and effective dispersion milling step. The process of the present invention can provide the variables required to obtain a desired particle size pigment over a range of particle sizes by inclusion of various amounts of a particle size growth restraining agent.

Another advantage of the present invention is that it avoids the use of surfactants which interfere with some end use applications.

The first step of the invention is to premill the crude quinacridone in a ball mill, preferably along with about 8 to 10% based on the pigment of an inorganic salt such as sodium sulfate to avoid explosivity of the generated mill powder. The addition of the inorganic salt is generally not essential because the product is highly aggregated and not dusty. The product at this point is in the form of aggregates of sub-pigmentary size particles which are of low crystallinity. The premilling step, as used in this invention, is done in the complete absence of liquids, or if liquids are used, such as a phase directing solvent, or a surface active agent, they are present in such small amounts and of such a nature that the pigment retains the characteristic of a powder.

The preferred quinacridone starting material for the premilling step is gamma quinacridone.

After completion of the premilling step the quinacridone is ball milled in water.

It is impossible to set up limits as to the length of the aqueous milling step since it will vary depending on the mill loading and the type of mill being used. In order to establish the optimum length of time for milling under a given set of conditions, it is recommended that the invention be run with variations in both milling times and that samples of the finishe product be compared with standard samples exhibiting the desired degree of pigment quality.

The dry milling step may be performed using any of the conventional grinding elements such as steel balls and nails or steel cylinders and nails. The aqueous milling step should be carried out using steel shot from 2 to 6 mm in diameter.

Generally the aqueous milling medium will contain from 0.5 to 8 percent by weight of a base such as an alkali metal hydroxide or alkali metal phosphate.

In a preferred aspect of the invention the mill base in the aqueous milling step will contain from 0.5 to 5 percent by weight, based on the quinacridone present, of phthalimidomethylquinacridone as a particle growth inhibitor. The phthalimidomethylquinacridone may be added to the quinacridone either prior to the dry ball milling step or prior to the aqueous milling step.

After the aqueous milling operation the quinacridone pigment normally is extracted with hot dilute acid, such as 1.5% sulfuric acid, in order to remove any metal which has become associated with the pigment during milling. Following the extraction step the pigment is dried.

In a preferred aspect of the invention the quinacridone is treated with from 1 to 3 percent by weight of naphthenic acid prior to the acid extraction step. This treatment serves to suppress particle aggregation during the drying step.

DESCRIPTION OF THE PREFERRED EMBODIMENTS

EXAMPLE I

Nine hundred pounds (409 kg) crude gamma quinacridone is ground in a commercial mill with 300 lbs (136 kg) of alum. The grinding medium consisted of 1.27 cm diameter by 2.54 cm long steel cylinders and railroad spikes. The mill is operated at about 50% of its "critical speed" (critical speed is the speed at which centrifugal force overcomes the force of gravity so that the milling elements are retained against the outer wall of the mill) for 14 hours. The mill is discharged through a screen which retains the steel cylinders and railroad spikes.

An 8 ounce ($24 \times 10^{-5}$ m$^3$) wide mouth jar is charged with 600 g of ⅛ inch (0.32 cm) diameter steel shot, 100 g water and 16 g of the premilled quinacridone mill powder from above (75% quinacridone, 25% alum) and 3 g of NaOH, and 0.6 g phthalimidomethylquinacridone. The jar is rotated at 90 ft/min. 0.457 meter per second for 24 hours. The aqueous milled product is diluted with an equal volume of water and acid extracted with 2% sulfuric acid at 90° C. for 2 hours. The pigment is dried at 85° C.

When dispersed in a universal colorant vehicle and subsequently tinted into a latex paint base, the product was strong, yellow and intense vs. a similarly prepared commercial, gamma quinacridone product.

EXAMPLE II

Premilling of the crude gamma quinacridone is carried out as in Example I. The aqueous milling step is carried out as in Example I. Prior to the extraction step with sulfuric acid 0.24 gram of naphthenic acid is added to the pigment dispersion. The extraction step and drying step are carried out as in Example I.

The product when tested in the same universal colorant system of Example I showed an improvement in strength in latex (aqueous) paint base and significantly less flocculation in an alkyd (oil) base.

I claim:

1. A process comprising dry ball milling crude quinacridone to convert it to a highly agglomerated low crystallinity form, followed by milling the low crystallinity material with shot in water in the presence of a minor amount of base and recovering a pigmentary particle size pigment.

2. The process of claim 1 wherein from 0.5 to 5 percent by weight phthalimidomethylquinacridone is co-milled with the quinacridone in the water milling step.

3. The purpose of claim 2 wherein the quinacridone is gamma quinacridone.

4. The process of claim 3 wherein the water milled quinacridone is extracted with a hot dilute acid and dried.

5. The process of claim 4 wherein from 1 to 3 percent by weight based on quinacridone of naphthenic acid is added to the pigment prior to completion of the acid extraction step.

* * * * *